United States Patent
Kasravi et al.

(10) Patent No.: US 11,256,831 B2
(45) Date of Patent: Feb. 22, 2022

(54) SYSTEM AND METHOD FOR SECURE ELECTRIC POWER DELIVERY

(71) Applicants: Kas Kasravi, West Bloomfield, MI (US); James E. Lucari, Meadow Vista, CA (US); Don D. McCracken, Jr., Sacramento, CA (US); Roy D. Baird, Tomball, TX (US); Oleg V. Nikolsky, Flint, MI (US); Kenneth M. Radford, Monmouthshire (GB); Cori B. Reading, Loomis, CA (US)

(72) Inventors: Kas Kasravi, West Bloomfield, MI (US); James E. Lucari, Meadow Vista, CA (US); Don D. McCracken, Jr., Sacramento, CA (US); Roy D. Baird, Tomball, TX (US); Oleg V. Nikolsky, Flint, MI (US); Kenneth M. Radford, Monmouthshire (GB); Cori B. Reading, Loomis, CA (US)

( * ) Notice: Subject to any disclaimer, the term of this patent is extended or adjusted under 35 U.S.C. 154(b) by 120 days.

(21) Appl. No.: 16/681,781

(22) Filed: Nov. 12, 2019

(65) Prior Publication Data
US 2021/0141945 A1    May 13, 2021

(51) Int. Cl.
*G06F 7/04*      (2006.01)
*G06F 21/81*   (2013.01)
(Continued)

(52) U.S. Cl.
CPC .......... *G06F 21/81* (2013.01); *G06F 21/552* (2013.01); *H02J 13/00* (2013.01); *H04L 63/062* (2013.01); *G06F 2221/034* (2013.01)

(58) Field of Classification Search
CPC .. G06F 21/552; G06F 21/81; G06F 2221/034; H02J 13/00; H04L 63/062
See application file for complete search history.

(56) References Cited

U.S. PATENT DOCUMENTS

| 76,988 A | * | 4/1868 | Bruck ................... | A45B 27/00 |
| | | | | 416/73 |
| 7,319,717 B2 | * | 1/2008 | Zitting ................... | H04B 3/542 |
| | | | | 340/12.32 |

(Continued)

OTHER PUBLICATIONS

Shabdhawana Jain, Shailendra Yadav. 2015. A Survey Paper on Digital Modulation Techniques. International Journal of Computer Sciences and Engineering. vol. 3, Issue-12: 107-111. See: I Introduction, and II Digital Modulation techniques section.

(Continued)

*Primary Examiner* — Gary S Gracia
(74) *Attorney, Agent, or Firm* — David Millers

(57) ABSTRACT

An information security system and method that provides electric power to an authorized user and denies electric power to an unauthorized user. An administrator requests access for a user, and a site controller generates a key/receptacle tuple for the use. The key/receptacle tuple is communicated to a site power source, which broadcasts the key/receptacle information to all secure receptacles in a facility, or other infrastructure. The key is also communicated to the user. The user plugs in a device into a secure receptacle and provides the key via a secure adapter between the device and the secure receptacle. If the key is valid, the users' device is supplied with electric power; otherwise, electric power is denied to the unauthorized user's device. The usage of the secure receptacles are logged and analyzed by the site controller and reports are communicated to the administrator.

15 Claims, 17 Drawing Sheets

(51) Int. Cl.
    *H04L 29/06*          (2006.01)
    *H02J 13/00*          (2006.01)
    *G06F 21/55*          (2013.01)
    *G06F 15/16*          (2006.01)

(56) References Cited

U.S. PATENT DOCUMENTS

| | | | | |
|---|---|---|---|---|
| 7,364,470 | B2* | 4/2008 | Hashim | H05K 1/0228 |
| | | | | 439/676 |
| 7,800,253 | B2* | 9/2010 | Hubbard | H04B 3/548 |
| | | | | 307/140 |
| 8,076,988 | B2* | 12/2011 | Smith | H03C 3/00 |
| | | | | 332/118 |
| 8,099,611 | B2* | 1/2012 | Karam | H04L 12/10 |
| | | | | 713/300 |
| 8,570,067 | B2* | 10/2013 | Drapkin | H04L 25/028 |
| | | | | 326/80 |
| 9,193,474 | B2* | 11/2015 | Ives | H04B 3/542 |
| 2007/0146127 | A1* | 6/2007 | Stilp | G08B 1/08 |
| | | | | 340/531 |
| 2010/0013539 | A1* | 1/2010 | Novak | G06F 13/4072 |
| | | | | 327/333 |
| 2011/0077809 | A1* | 3/2011 | Leary | B60L 53/14 |
| | | | | 701/22 |
| 2012/0086546 | A1* | 4/2012 | Montgomery | H02J 3/14 |
| | | | | 340/5.1 |
| 2012/0186309 | A1* | 7/2012 | Ishida | B60L 50/61 |
| | | | | 70/57 |
| 2013/0040486 | A1* | 2/2013 | Kurumizawa | B60L 53/16 |
| | | | | 439/350 |
| 2014/0002018 | A1* | 1/2014 | Montemayor Cavazos | |
| | | | | B60L 50/52 |
| | | | | 320/109 |
| 2017/0099293 | A1* | 4/2017 | Tan | G06F 21/40 |
| 2019/0147157 | A1* | 5/2019 | Moorman | H04W 4/80 |
| | | | | 713/171 |
| 2019/0173239 | A1* | 6/2019 | Hodge | H01R 13/665 |
| 2019/0181638 | A1* | 6/2019 | Chapel | H02J 13/00004 |

OTHER PUBLICATIONS

M.M. Bech, F. Blaabjerg, J.K. Pedersen. Jul. 2000. Random modulation techniques with fixed switching frequency for three-phase power converters. IEEE Transaction on Power Electronics. vol. 15, Issue 4: 753-761. See: Entire article.

* cited by examiner

SYSTEM AND METHOD FOR SECURE ELECTRIC POWER DELIVERY

BACKGROUND OF THE INVENTION

1. Field of the Invention

The present invention relates generally to information and device security, and specifically, to a system and method to secure the flow of information, or a device, by denying electrical power to a device, such as a computer, a laptop, or a mobile device, or any device requiring electrical power to operate.

2. Background

Currently there are a number of solutions for information security. Some of these solutions attempt to keep an information-based device within the physical possession of the owner, but these solutions fail to meet the needs of the industry because such devices can be stolen or misplaced by the owner. Other solutions attempt to use passwords, but these solutions are similarly unable to meet the needs of the industry because passwords can be hacked via many nefarious means. Still other solutions seek to encrypt the information, but these solutions also fail to meet industry needs because of cyber-attacks.

Information security has been a challenge since the inception of computing decades ago, where the first attacks were reported in the 1970s. The media regularly publishes incidents of cyber-attacks, hacking, and data breaches. The reported losses are significant, and the trend of such attacks is increasing. For example, it has been reported that the net cost of an information breach far exceeds the cost of the device in question, where the average loss has been reported as high as $49,000, which cannot be sustained by individual users and most businesses. Further, it has been reported that 52% of information-based devices are stolen from office and workplaces and 24% at public events such as industry conferences. The internet and computer networks further provide attack surfaces to the malfeasants. Other media reports suggest that the number of cyber-attacks and data breaches has increased ten-fold during the past 15 years.

Considering the cost of unauthorized access to data and information devices, and the increasing trends in the number of such attacks, it is clear that the current solutions are inadequate and there is a need for improved information security.

It would be desirable to have a system that intercepts information security attacks at the initial point of the attack, which is an attacking device used by the malfeasants. Thus, it would be desirable to disable the attacking devices in the most fundamental manner, which is shutting it down by denying it electrical power. Furthermore, it would also be desirable to have a system that distinguished between an attacking device and an authorized device. Further, a system that renders a stolen device inoperative, thus reducing the threat of theft. Still further, it would be desirable to have a system that places as little burden on system administrators and users of authorized devices as possible. Therefore, there has been a long-felt need in the industry for a system and associated method that disables attacking devices and yet places very little burden on authorized users.

SUMMARY OF THE INVENTION

The present invention advantageously fills the aforementioned deficiencies by providing a system and method for secure electric power delivery, which provides a system and method for intercepting an attacking device and disabling it by validating its authenticity and denying it of electrical power if it is not authenticated.

The present invention is a system together with an associated method directed at detecting an unauthorized information-based device and denying it of electrical power on the premises of the user.

The system of the present invention is made up of the following components: at least one secure receptacle each having a site-side modem, an adapter-side modem, a receptacle electric power inlet, a receptacle power outlet, a relay, a receptacle identifier, a receptacle key manager module, a current detector, and a receptacle microcontroller; a site power source having an electric power source, a site electric power inlet, a site electric power outlet, a site microcontroller, a site key manager module, a site remote communication module, a site modem, and a receptacle identifier database; at least one device used by a user; at least one secure adapter, having a key entry module, an adapter electric power inlet, and electric power outlet, and an adapter modem; a powerline, where the powerline transmits both electric power and communication signals; and a central controller having a central key manager module capable of generating a key, a central microcontroller, and a central remote communication module.

These components are connected as follows: the powerline connects the electric power source to the site power source, the secure receptacles, the secure adapters, and the devices via the respective electric power inlets and outlets. At the request of an administrator the central controller generates and communicates a key to the user and to the site controller via the respective remote communication modules. In the present invention, the administrator refers to either an individual, an automated system, or both. The user enters the key into the key entry module of the secure adapter. Each device is connected to the respective secure adapter's adapter electric power outlet. The current detector detects a device connected to the secure receptacle and in coordination with a logic in the receptacle microcontroller a time-out signal is issued if a valid key is not entered within a pre-determined time. Upon receiving the key in a timely manner, the relay is closed, and electrical current is provided to the device; if not, the relay is opened, and the device is denied of electrical power.

In an embodiment of the present invention the secure adapter is a distinct device and separate from the secure receptacle and the device. In a different embodiment the secure adapter is integrated within the device. In a yet different embodiment, the secure adapter is integrated within the secure receptacle. Further, in an embodiment the adapter electric power inlet is co-located with the aforementioned secure receptacle components. In the preferred embodiment the adapter electric inlet is located a distance away from the remaining components of the secure receptacle to avoid tampering with the receptacle. Further, in the said preferred embodiment the secure adapter is integrated with the secure receptacle and the key entry component is co-located with the adapter electric inlet, thus accessible to the user where the device is plugged into the secure adapter.

The method of the present invention is made up of the following steps: authorizing a user in a central key manager module and in a site key manager module by an administrator; generating a key in the central key manager module for the user; receiving the key by the user from the central key manager module; connecting a secure adapter by the user; connecting the secure adapter to an electric power outlet of a secure receptacle; entering the key into a key entry module of the secure adapter by the user; modulating the key by an adapter modem into a user key signal, where the user key signal is combined with an electrical power through the secure adapter; receiving the user key signal by an adapter-side modem from the electrical power; demodulating the key from the user key signal by the adapter-side modem; transmitting the key from the adapter-side modem to a receptacle key manager module; receiving a key/receptacle tuple by the site key manager module from the central key manager module; communicating the key/receptacle tuple to a site modem via a site microcontroller and a receptacle controller; modulating the key/receptacle tuple by the site modem into a site key signal, where the site key signal is combined with the electrical power; receiving the site key signal by a site electric power outlet; broadcasting the key signal by the site electric power outlet to each receptacle electric power inlet; demodulating the key/receptacle tuple from the site key signal by a site-side modem; transmitting the key/receptacle tuple from the site-side modem to the receptacle key manager module; validating the authenticity of the key entered into the secure adapter by the user against the combined key/receptacle tuple broadcasted by the site key manager module and a receptacle identifier within a receptacle microcontroller in the secure receptacle; closing a relay in the secure receptacle upon validation of the key received by the secure receptacle within a user time out period; opening the relay in the secure receptacle upon failure to validate the key received by the secure receptacle; and closing the relay in the secure receptacle upon expiration of a continuity time-out period.

The system of the present invention may also have one or more of the following: the secure receptacle's receptacle power outlet is located remotely from the remaining components of the secure receptacle; the site power source has a receptacle controller, a receptacle identifier database, and a power conditioner; the secure adapter is connected to the device via a cable; and the secure adapter is connected to the device via a port; and the secure adapter is integrated within the device.

Similarly, the method associated with the present invention may also include one or more of the following steps: communicating the key validation status to an activity log in a central controller; logging the key validation activities in the activity log by the central controller; and reporting key and secure receptacle usage and anomalies to the administrator.

The present invention device is unique when compared with other known devices and solutions because the present invention provides: (1) information security via disabling a suspected attacking device by denying it electrical power; (2) a secure receptacle where the electrical power is turned on or off via a relay based on user authentication; and (3) a secure adapter for validating a device. Similarly, the associated method is unique in that it: (1) utilizes a key to enable or disable a device via providing or denying electrical power through a receptacle; and (2) provides breach and hacking analytics to accelerate intrusion detection prior to any hack or breach.

The present invention is unique in that it is structurally different from other known devices or solutions. More specifically, the present invention is unique due to the presence of: (1) a relay in a receptacle; (2) turning power on/off at the receptacle in response to user authentication; and (3) accelerating intrusion detection upon an attempt to connect an attacking device to the facility power and prior to actual hacking or data breach.

Among other things, it is an object of the present invention to provide a system and method for secure electric power delivery that does not suffer from any of the problems or deficiencies associated with prior solutions.

It is an objective of the present invention to provide information security via detecting a potential attacking device upon its connection to a facility's powerline, where a facility is any location where powerlines deliver electric power, such as but not limited to facilities, factories, warehouses, aircrafts, busses, ships, and houses. It is still further an objective of the present invention to disable an attacking device by denying it electrical power. Further still, it is an objective of the present invention to detect an attempted intrusion prior to hacking or data intrusion. Additionally, it is an objective of the present invention to render inoperable any device that requires power without authentication, thus greatly reducing the likelihood of the device being stolen or misused.

The present invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DETAILED DESCRIPTION OF THE INVENTION

Figure 1A:
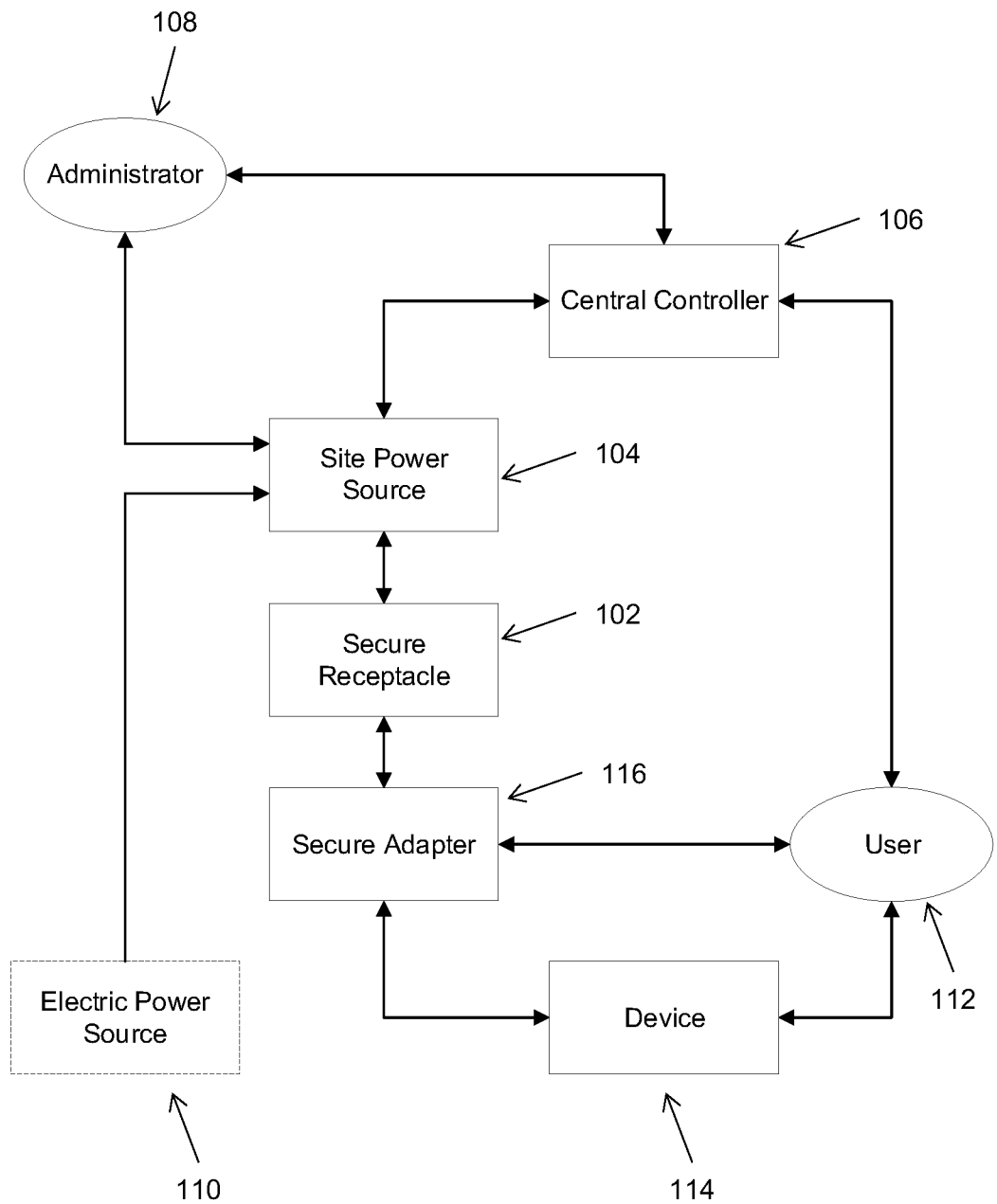
FIG. 1A shows the overall system architecture where the secure adapter is a separate component.

The present invention is directed to a system and method for secure electric power delivery. More specifically, the present invention provides a secure receptacle that provides electric power to an authorized device and denies electric power to an unauthorized device. A receptacle is considered to be any port that supplies electric power, such as but not limited to the conventional household electric receptacles, industrial electric receptacles, USB ports, vehicle cigarette lighters, and on-board diagnostic ports. A key is used to determine the status of the device as authorized or unauthorized. An administrator requests a key, a central controller generates and distributes a unique key to the user and the site power source, where the key is optionally paired with at least one secure receptacle (key/receptacle tuple), this selectively providing access to specific receptacles or all receptacles. Optionally, the administrator requests an access duration when requesting a key, thus limiting the duration of access by the user. Optionally, an alert is issued to the user prior to the termination of duration. Optionally, the user may request, and the administrator may extend the duration prior to termination of the duration. The present invention is intended to be used with the existing electric powerline within a facility, and the electric powerline carries both electrical current and the keys, where the key is modulated and demodulated at each component along the powerline.

The figures herein follow a numbering convention in which the first digit or digits correspond to the drawing figure number and the remaining digits identify an element or component in the drawing. Similar elements or components between different figures may be identified using similar digits. For example, 145 may reference element "45" in FIG. 1, and a similar element may be referenced as 245 in FIG. 2. Elements shown in the various figures herein can be added, exchanged, and/or eliminated to provide a number of additional examples of the present disclosure. In addition, the proportion and the relative scale of the elements provided in the figures are intended to illustrate the examples of the present disclosure and should not be taken in a limiting sense.

FIGS. 1A through 6 describe the system of the present invention, as follows.

FIG. 1A shows the overall system architecture where the device and the secure adapter are separate components. An administrator 108 requests a key via a site power source 104 for a user 112, where such request is for access to at least one secure receptacle 102. Optionally, the administrator requests an access duration when requesting a key, thus limiting the duration of access by the user. Optionally, an alert is issued to the user prior to the termination of the duration. Optionally, the user may request, and the administrator may extend the duration prior to termination of the duration. The request by the administrator is processed by a central controller 106, which generates and distributes a key to the site power source 104 and the user 112. The key received by the site power source 104 is paired with at least one unique secure receptacle 102 (key/receptacle tuple), and the site power source propagates the key to each secure receptacle as requested by the administrator 108. The central controller 106 also distributes the key to the user 112. The structure of the key is that of a secure key used in the security industry and known to a person having ordinary skill in the art. For example, the key is an alphanumeric code, optionally case sensitive and having special characters. The key is also optionally encrypted during transmission to the site power source 104 and the user 112 for security. The site power source 104 and the secure receptacle 102 are typically located within a conventional facility. The site power source 104 receives electrical power from an electric power source 110, which is typically a conventional electric power source providing power to infrastructure. Optionally, the electric power source 110 is a generator. In addition to electrical power, the site power source controller embeds the key/receptacle tuples received from the central controller 106 within the powerline that distributes electrical power to other components; thus, the key is received by the secure receptacle 102. The user, having received the key, plugs a device 114 into a secure adapter 116 that is plugged into the secure receptacle 102. Upon proving a key that is valid for the secure receptacle 102 electrical power is provided to the device 114; alternatively, the device 114 is denied of electrical power.

Figure 1B:
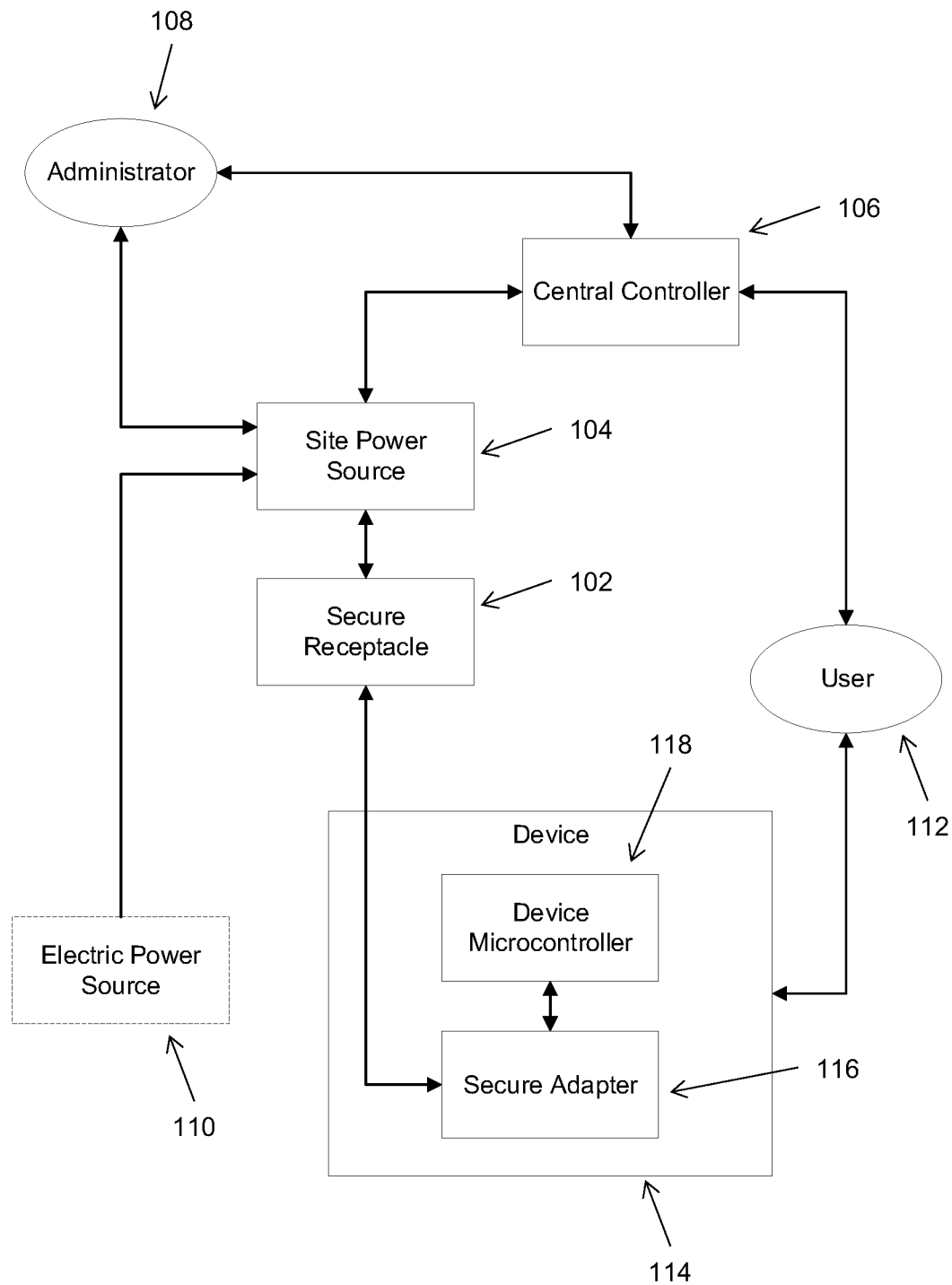
FIG. 1B shows the overall system architecture where the device and secure adapter are integrated.

FIG. 1B shows a configuration similar to that shown in FIG. 1A, except the secure adapter 116 being integrated with the device 114. The functionality of the secure adapter 116 is enabled via interaction with a logic within a device microcontroller 118 in the device 114. The device microcontroller 118 is a simple commercially available microcontroller known to a person having ordinary skill in the art. The device microcontroller 118 performs pre-programmed logic functions.

In this embodiment, the secure adapter 116 is built-in the device 114, thus transparent to the user 112. The desired functionality of the secure adapter 116 is obtained when the device 114 is plugged into the secure receptacle 102.

Figure 1C:
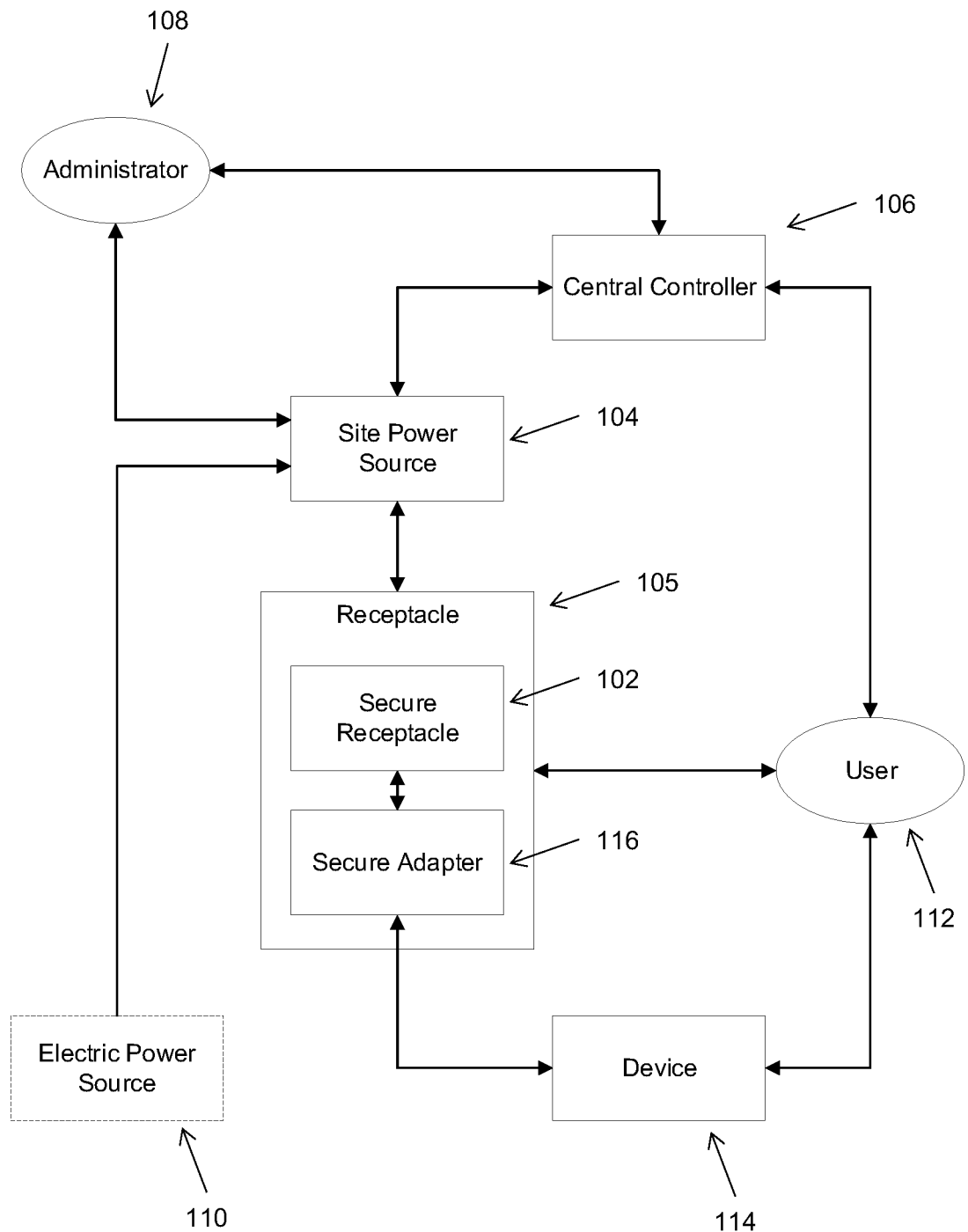
FIG. 1C shows the overall system architecture where the receptacle and the secure adapter are integrated.

FIG. 1C shows a configuration similar to that shown in FIG. 1A, except for the secure adapter 116 being integrated with the secure receptacle 102 in a receptacle 105. In this configuration, the functionality of the secure adapter 116 is performed within the receptacle 105, thus transparent to the user 112. The desired functionality of the secure adapter 116 is obtained when the device 114 is plugged into the receptacle 105.

Figure 2A:
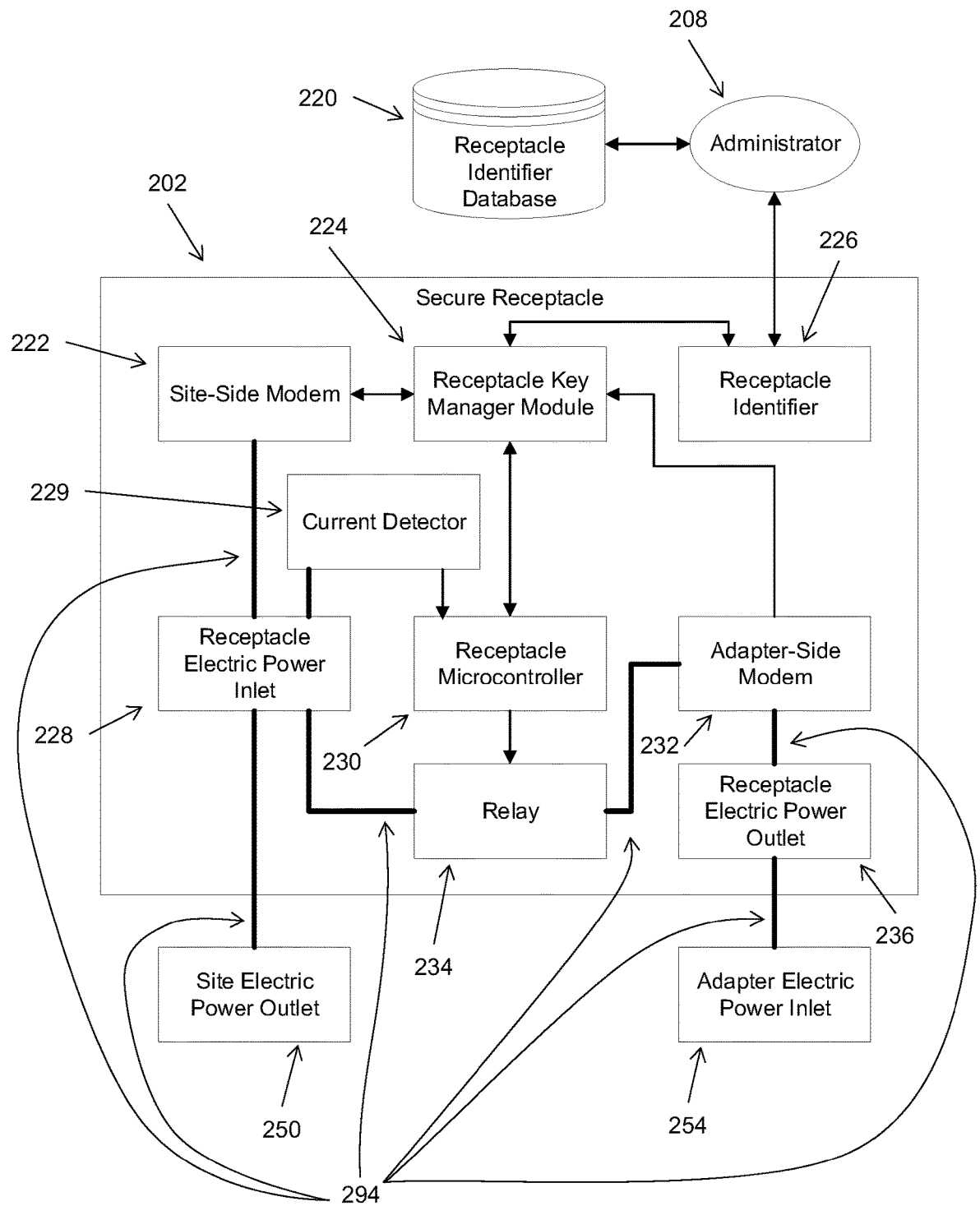
FIG. 2A shows the configuration of the secure receptacle.

FIG. 2A shows the configuration of the secure receptacle 202 and the components therein. External to the secure receptacle, the administrator 208 maintains a receptacle identifier database 220 within the site power source 104. This database stores unique identifiers for all the receptacles and used by the administrator 208 to grant access to the user 112 to any combination of the receptacles. The secure receptacle 202 has a receptacle electric power inlet 228 that receives electrical power from a site electric power outlet 250, where the latter is located within the site power source 104. The receptacle electric power inlet 228 transmits electrical power to a relay 234. The relay 234, if closed, transmits electrical power to an adapter-side modem 232, through which electrical power is transmitted to a receptacle electric power outlet 236 and to an adapter electric power inlet 254. When the relay is closed and a device is plugged into the adapter electric power inlet 254, the relay 234 allows current to flow through the secure receptacle 202. The adapter-side modem 232 transmits electrical power to a receptacle electric power outlet 236, which provides power to an adapter electric power inlet 254, where the latter is a component of the secure adapter 116. The receptacle electric power inlet 228 simultaneously transmits electrical power to a site-side modem 222 and a current detector 229. The electrical power is coupled with the aforementioned key/receptacle tuple, and the site-side modem 222 deciphers the key/receptacle identifier and conveys this information to a receptacle key manager module 224. The receptacle key manager module receives a unique receptacle identifier 226, as assigned by the administrator 208. The receptacle key manager module determines the validity of the key received against the receptacle identifier 226 and signals this information to a receptacle microcontroller 230. The receptacle microcontroller 230 is a simple commercially available microcontroller known to a person having ordinary skill in the art. The receptacle microcontroller performs pre-programmed logic functions. The current detector 229 also signals the receptacle microcontroller 230, essentially alerting the microcontroller that a device 114 is plugged in. Upon receiving a valid key and the status of a device plugged in, the receptacle microcontroller 230 performs the following functions:

- If the device is plugged in longer than a pre-determined time-out period, then a signal is sent to the relay 234 to open, thus denying electric power to the receptacle electric power outlet 236.
- If the relay 234 is open for a pre-determined disconnect period of time, then a signal is sent to the relay 234 to close, thus providing power to the electric power to a receptacle electric power outlet 236, essentially placing the outlet in a listen-mode to determine when another device is plugged in.
- If the device is plugged in for a time period shorter that the pre-determined time-out period and the user 112 provides a valid key, then the relay 234 is closed; thus, power is provided to the device.
- If the device is disconnected, which is determined by the current detector 229, then the microcontroller resets itself.

In the embodiments of the present invention the references to any modem includes any network interface device that modulates and demodulates signals that are on the powerline with the powerline acting like a network.

Figure 2B:
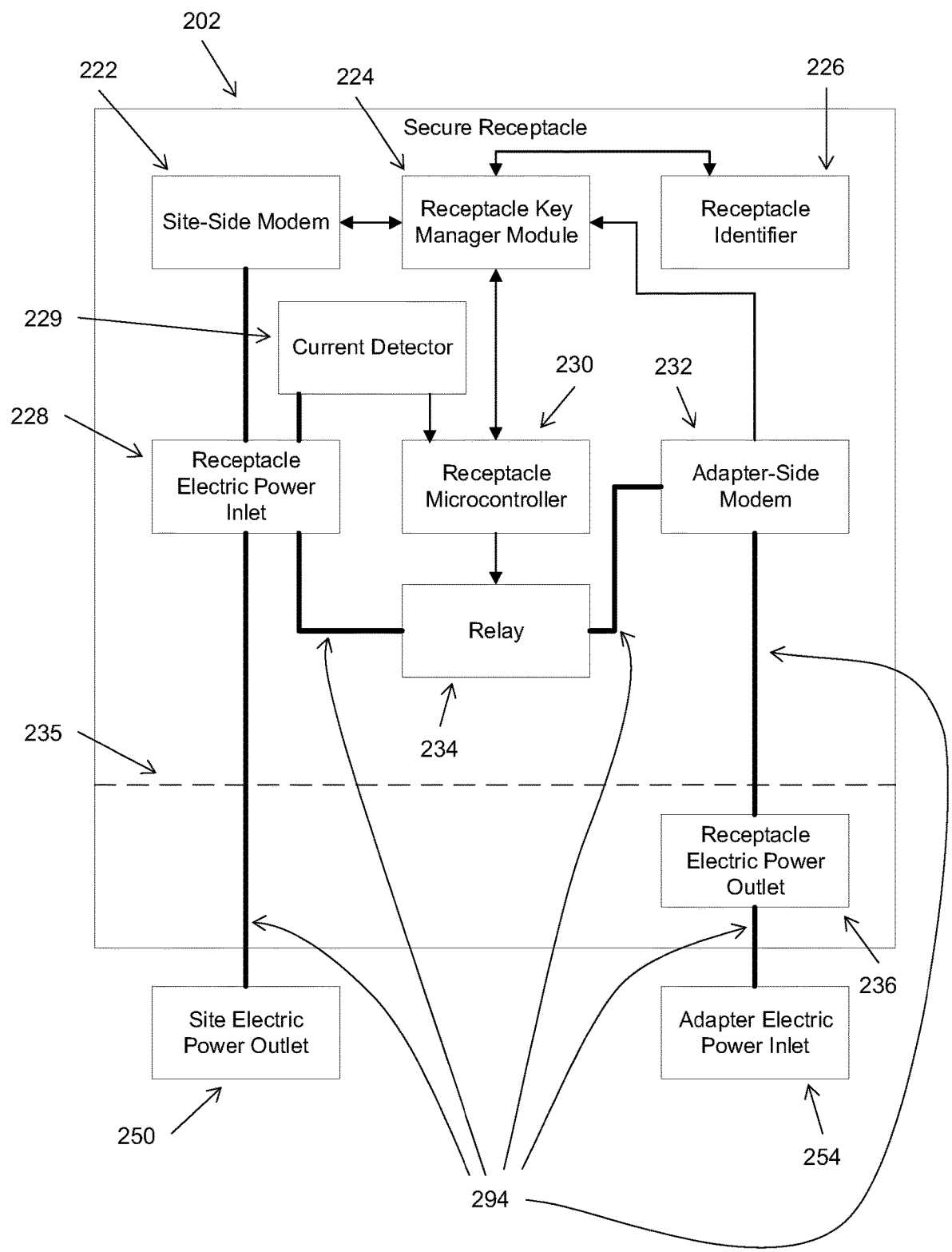
FIG. 2B shows the configuration of the secure receptacle where the secure receptacle is at a distance away from the adapter electric power inlet.

FIG. 2B shows a configuration similar to that shown in FIG. 2A, except for the remote location of the receptacle power outlet 236 relative to the remaining components of the secure receptacle 202 via a separation 235, where the separation 235 is achieved via using the facility's electrical conduits and extending the powerline between the receptacle electric power outlet and the adapter-side modem 232. In the embodiment shown in FIG. 2B the components of the secure receptacle 202 are located in a secure location and only the receptacle electric power outlet 236 is made accessible to the user, thus eliminating the possibility of tampering with the secure receptacle 202.

Figure 2C:
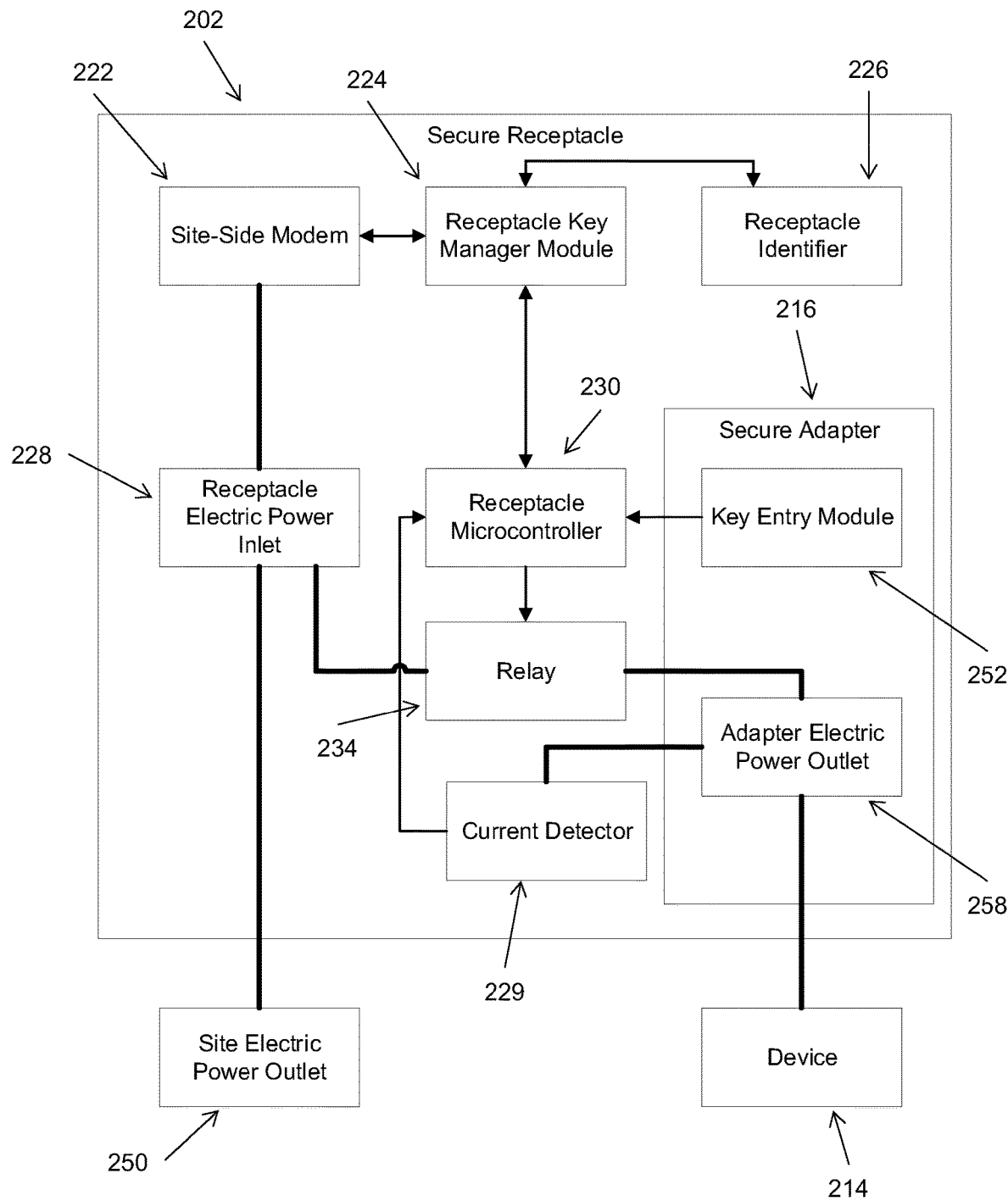
FIG. 2C shows the configuration of the secure receptacle where the secure adapter is integrated with the secure receptacle.

FIG. 2C shows a configuration similar to that shown in FIG. 2A, except for the integration of the secure adapter 216 within the secure receptacle 202. In this embodiment, the key entry module 252 of the secure adapter 216 is directly connected to the receptacle microcontroller 230, thus eliminating the need for the adapter-side modem 232 shown in FIGS. 2A and 2B. Further, the adapter electric power outlet 254 is connected directly to the relay 234 and the current detector 229. In this embodiment, the user would plug in the device 214 directly to the secure receptacle 202 and enters the key via the key entry module 252. A person having ordinary skill in the art would recognize that the adapter electric power outlet 254 is optionally located remotely from the secure receptacle 202 as shown in FIG. 2B.

Figure 3:
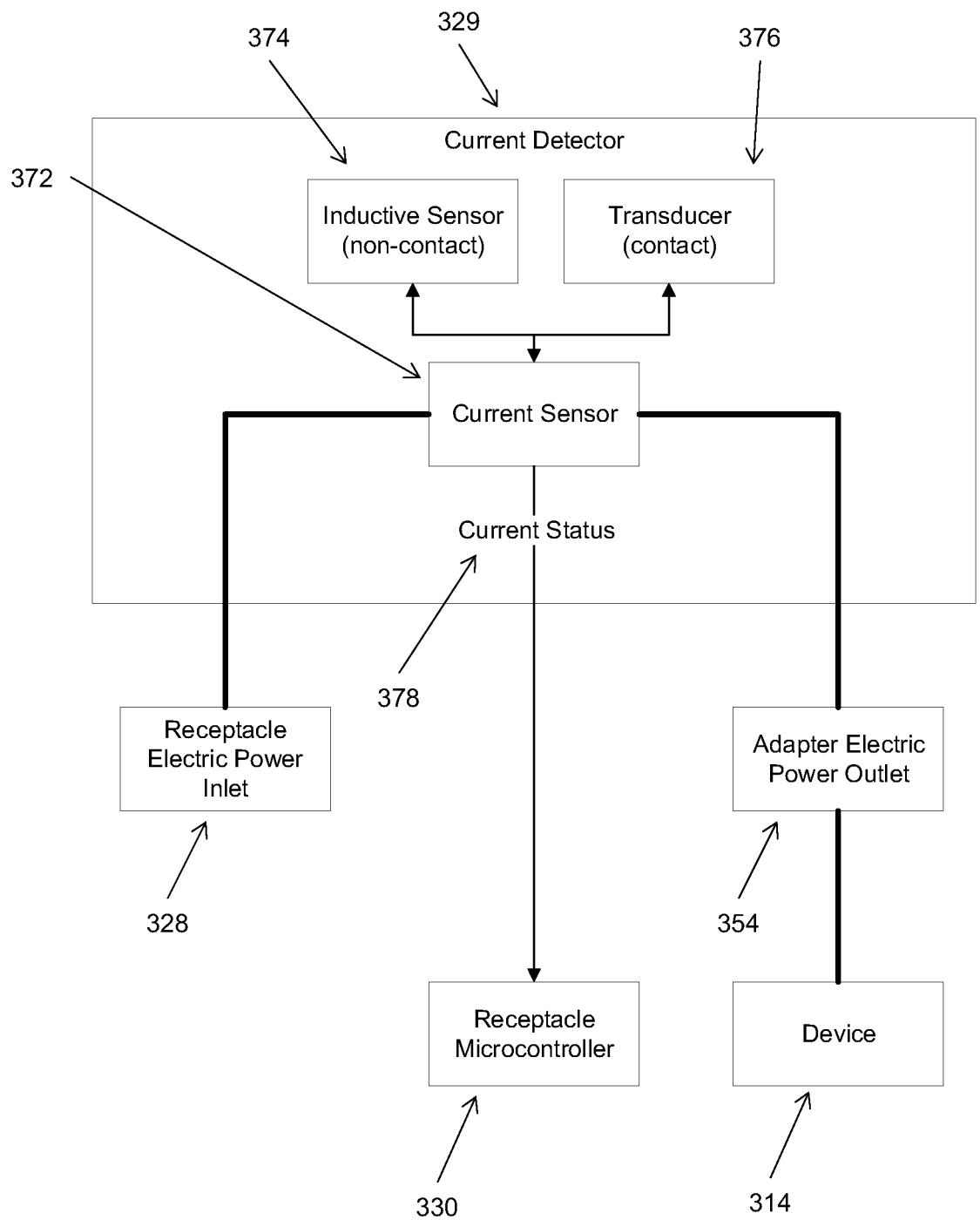
FIG. 3 shows the configuration of the current detector within the secure receptacle.

FIG. 3 shows the configuration of the current detector 329 referenced earlier in the secure receptacle 202. The current detector 329 detects when the device 314 is plugged into the secure receptacle 202 by sensing the current and signaling the receptacle microcontroller 330. A current sensor 372 is connected to the receptacle electric power inlet 328 and adapter electric power outlet 358 as configured in FIG. 2A and FIG. 2B. In either case, the current sensor 372 detects the current drawn when the device 314 is plugged into the receptacle, or simply that a device is plugged in. A person having ordinary skill in the art would recognize that the current sensor 372 can detect an electric current using various devices and processes, such as one of inductive sensor 374 and transducer 376, where the inductive sensor 374 detects a current in a non-contact manner and the transducer 376 detects a current via contact. The current sensor 372 sends a current status signal 378 to the receptacle microcontroller 330, where the signal indicates the presence or the absence of a current through the current detector 329.

Figure 4:
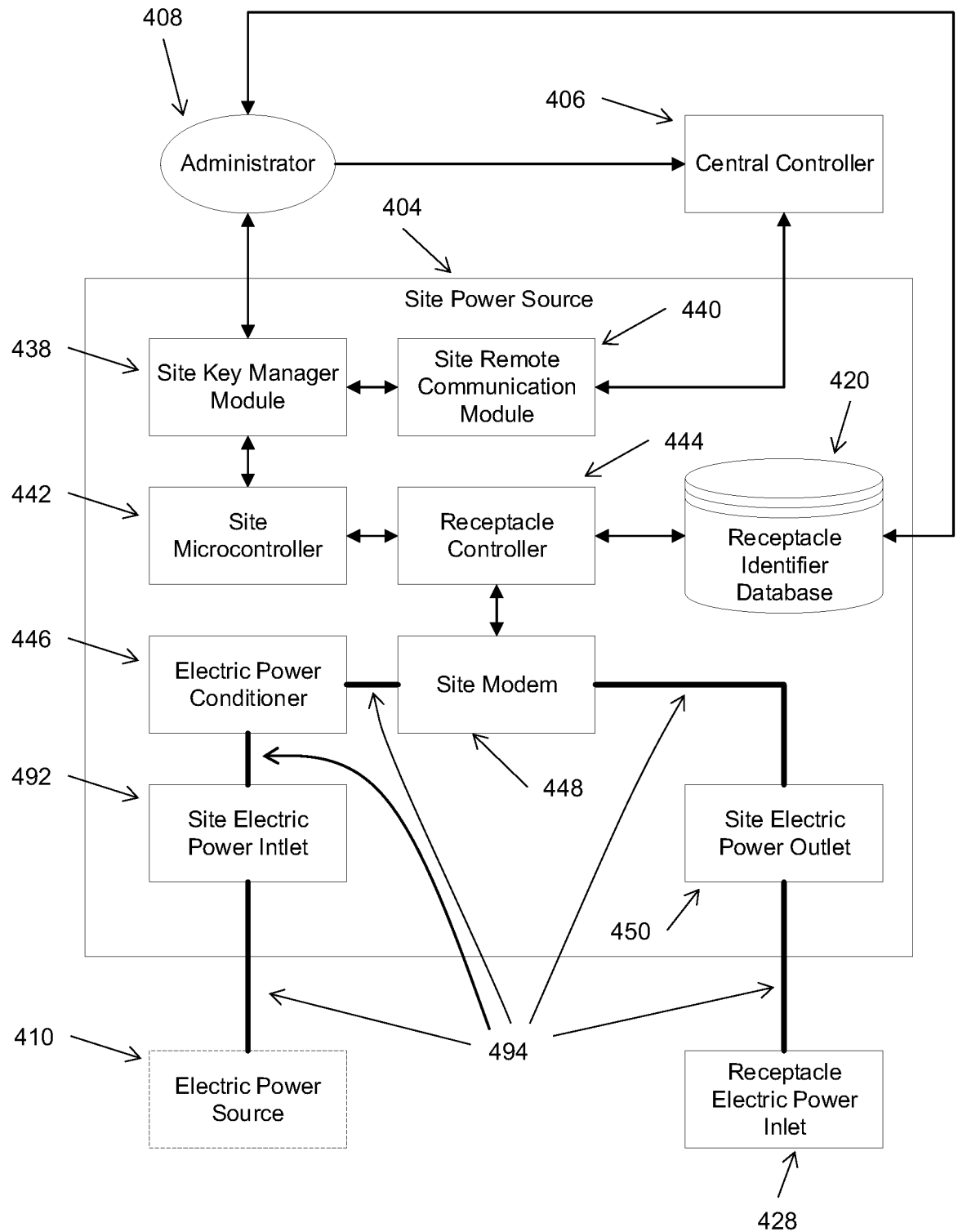
FIG. 4 shows the configuration of the site power source.

FIG. 4 shows the request for a key by the administrator 408, the assignment of the key by the central controller 406, and the distribution of electric power and the key via the powerline to the secure receptacles 202. The administrator reviews the receptacle identifiers 226 provided in the receptacle identifier database 420 and requests a key to be generated for the user 112 by sending a request to both a site key manager module 438 and the central controller 406. The central controller 406 generates a key for the requested secure receptacles and communicates this information to a site remote communication module 440, which is forwarded to the site key manager module 438. The key and receptacle information are forward by the site key manager 438 to the site microcontroller for comparison and verification against the request made by the administrator 408. The site microcontroller 442 is a simple commercially available microcontroller known to a person having ordinary skill in the art. The site microcontroller 442 performs pre-programmed logic functions. If the key is verified by the site microcontroller, a receptacle controller 444 receives the key verification information from the site microcontroller 442 and compares the requested receptacle information against the receptacle identifier database 420. If the verification is successful, the receptacle controller 444 forwards the key/receptacle tuple to a site modem 448, which encodes the key/receptacle information into the powerline 494 for distribution to the entire electric power infrastructure in the facility. A site electric power inlet 492 receives electric power from the electric power source 410, where the electric power is conducted via powerlines 494. An electric power conditioner 446 receives the electric power from site electric power inlet and conditions it by removing power spikes and unwanted noise. The electric power conditioner 446 is a simple commercial power conditioner known to a person having ordinary skill in the art. The electric power conditioner conducts the electric power to the site modem 448, where the electric power and the key/receptacle tuples are combined and conducted to a site electric power outlet 450. The output from the site electric power outlet is subsequently conducted to all the secure receptacles 428 through the facility via the facility powerline infrastructure.

Figure 5:
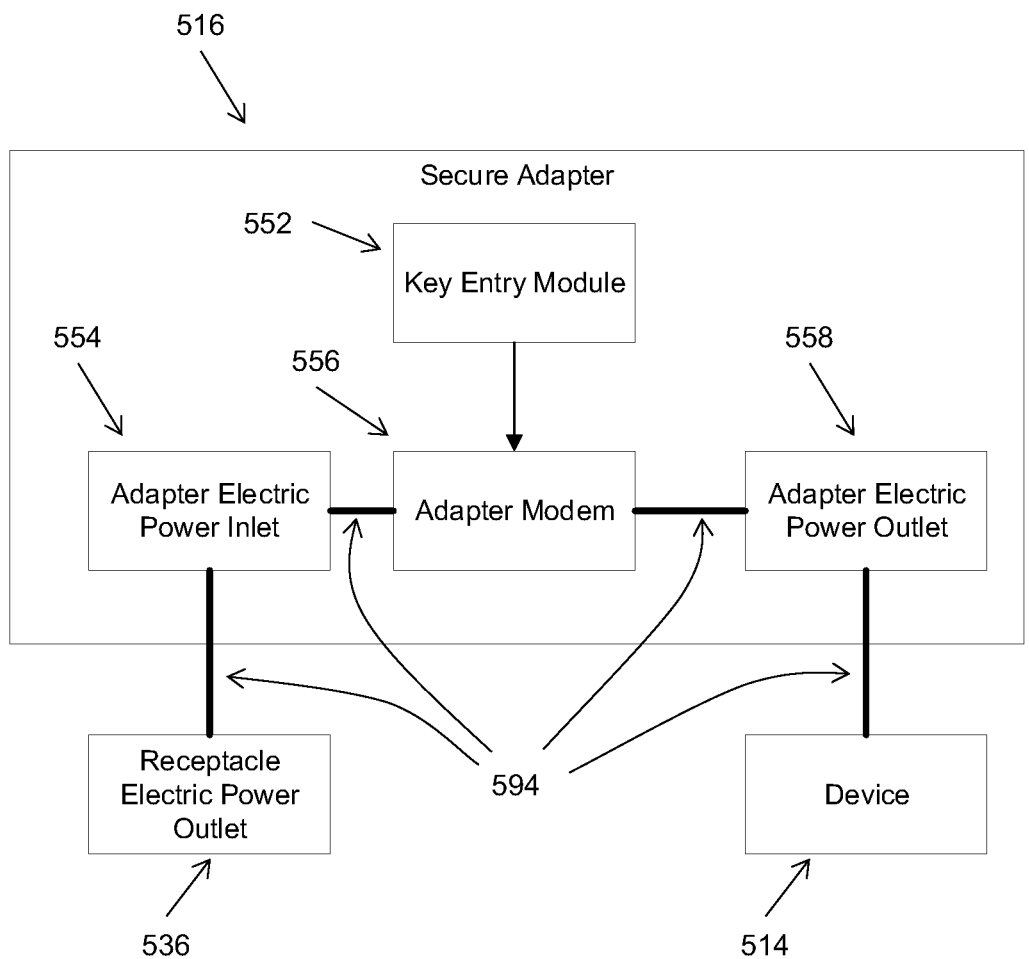
FIG. 5 shows the configuration of the secure adapter.

FIG. 5 shows the configuration of the secure adapter 516, which is positioned between a device 514 and the receptacle electric power outlet 536. The function of the secure adapter 516 is to capture the key from the user 112 and convey this information to the secure receptacle 102 and to provide electric power to the device 514. The user 112 enters the key via the key entry module 552 via any combination of commercially available components such as a keypad, a Bluetooth device, or nearfield communication, which are known to a person having ordinary skill in the art. The key entered by the user 112 is communicated by the key entry module 552 to an adapter modem 556. The device 514 is connected to an adapter electric power outlet 558, which is subsequently connected to the adapter modem 556. The receptacle electric power outlet 536 is connected to an adapter electric power inlet 554, which is also connected to the adapter modem 556. The device 514 is thus connected to the secure receptacle 102 via powerline connections and a current draw, indicating the presence of the device 514 is detected by the current detector 229 in the secure receptacle 202. The adapter modem encodes the key entered into the key entry module 552, which is then conducted to the adapter-side modem 232 via powerline connections. As described earlier, different embodiments of the present invention allow the secure adapter 516 to be a standalone device between the device 514 and the secure receptacle 202, integrated within the device 514, or integrated within the secure receptacle 202, as desired. The secure adapter performs the same function in all such embodiments.

Figure 6:
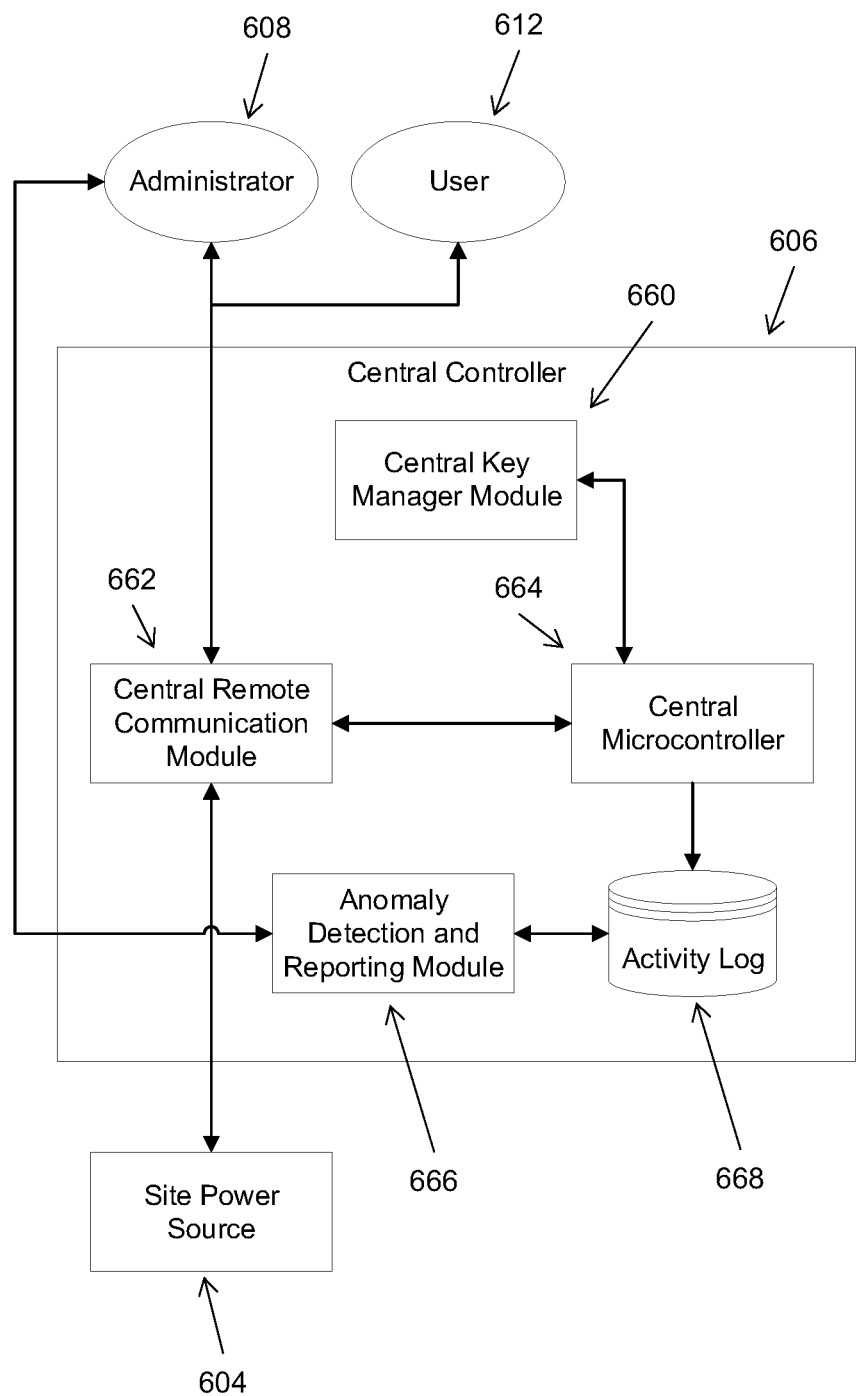
FIG. 6 shows the configuration of the central controller.

FIG. 6 shows the configuration of the central controller 606. The function of the central controller 606 is to generate and communicate keys for access to secure receptacles to the user 612 and the site power source 604, and to track and report usage activities to the administrator 608. A central remote communication module 662 receives a request for key for a user and any associated secure receptacles from the administrator 608. The request is communicated to a central microcontroller 664. The central microcontroller 664 is a simple commercially available microcontroller known to a person having ordinary skill in the art. The central microcontroller 664 performs pre-programmed logic functions. The central microcontroller 664 communicates with the central key manager module 660 to generate random and optionally encrypted keys for the requested secure receptacles. The key and the associated secure receptacles are also communicated to the central remote communication module 662, which remotely communicates the key and the relevant secure receptacle as a key/receptacle tuple to the site power source 604. The central remote communication module 662 also communicates the key to the user 612. The said remote communication is achieved via conventional means such as the internet, facility network, phone, e-mail, text messages, or print. Upon usage of the secure receptacles, whether authorized or unauthorized, the site power source 604 remotely communicates the secure receptacle usage and activities to the central remote communication module 662, which is subsequently forwarded to the central microcontroller 664. The central microcontroller 664 stores the usage information in an activity log 668 database. The activity log 668 is reviewed and analyzed by an anomaly detection and reporting module 666, which provides usage reports along with any anomalous activities to the administrator 608. The administrator 608 uses the reports to comprehend secure receptacle access information and determine any corrective security measures. Optionally, when an active intrusion is detected by the anomaly detection and reporting module 666 an immediate alert is sent the administrator 608.

With reference to the elements to the system disclosed in FIGS. 1 through 6, FIGS. 7 through 13 describe the methods and process for using the present invention, as follows.

Figure 7:
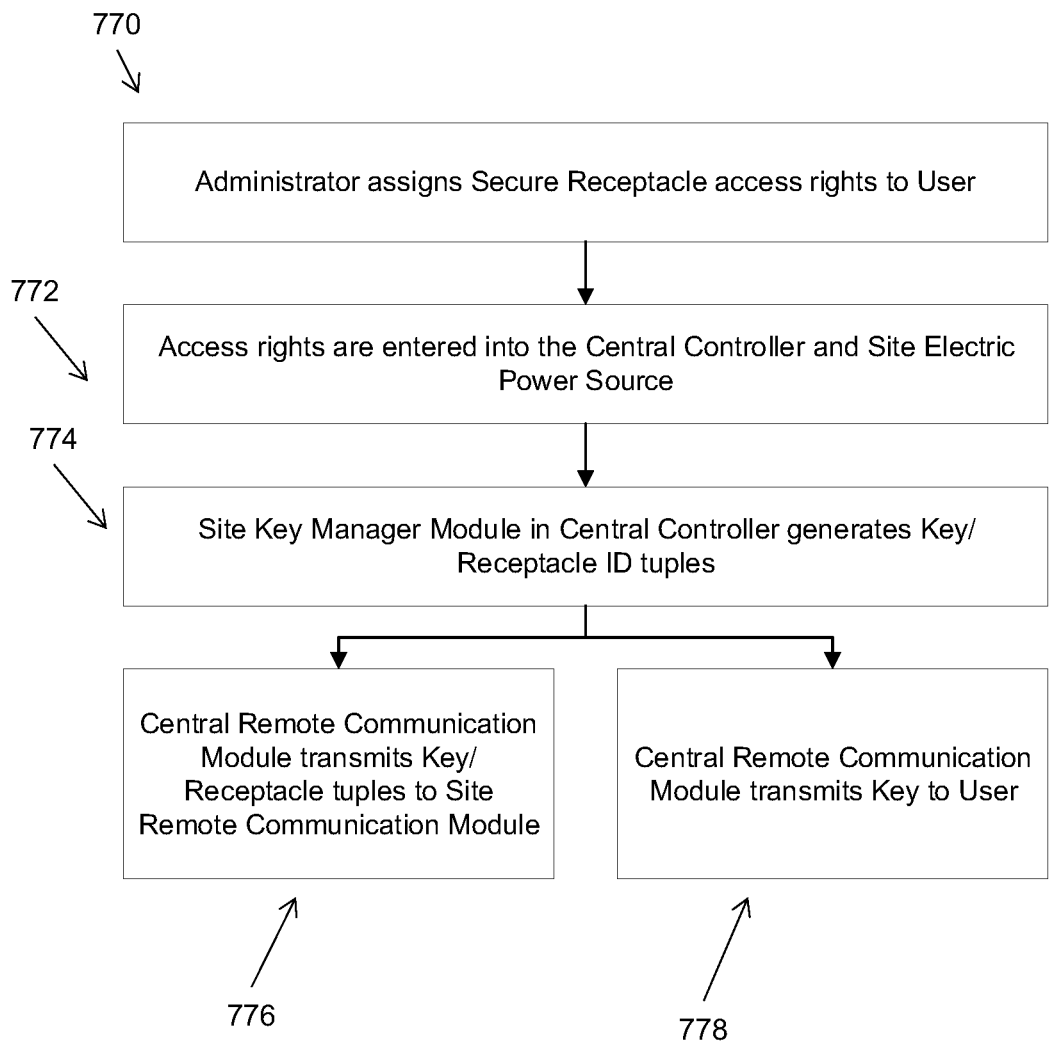
FIG. 7 shows the method for generation of the key.

FIG. 7 shows the method and process for generation of the key. In step 770 the administrator assigns secure receptacle rights to specific users, thus assigning access rights by determining which user will have access to which receptacle(s). Optionally, the access request may have an access duration or expiration information, such that the secure receptacle is available to the user for a limited period of time only. In step 772, the access rights determined by the administrator in step 770 are entered into the central controller and the site electric power source. In step 774, the site key manager module in the central controller receives the request for access rights and generates key/receptacle tuples, where the receptacles are identified by their respective receptacle identifiers. In step 776 the key/receptacle tuples are transmitted from the central controller to the site power source via communications between the central remote communication module and the site remote communication module. Thus, the site power source has valid keys that would allow the user to access specific receptacles, as determined by the administrator. In step 778 the central remote communication module transmits the key to the user; thus, allowing the user to use the key to gain access to the secure receptacles assigned by the administrator.

Figure 8:
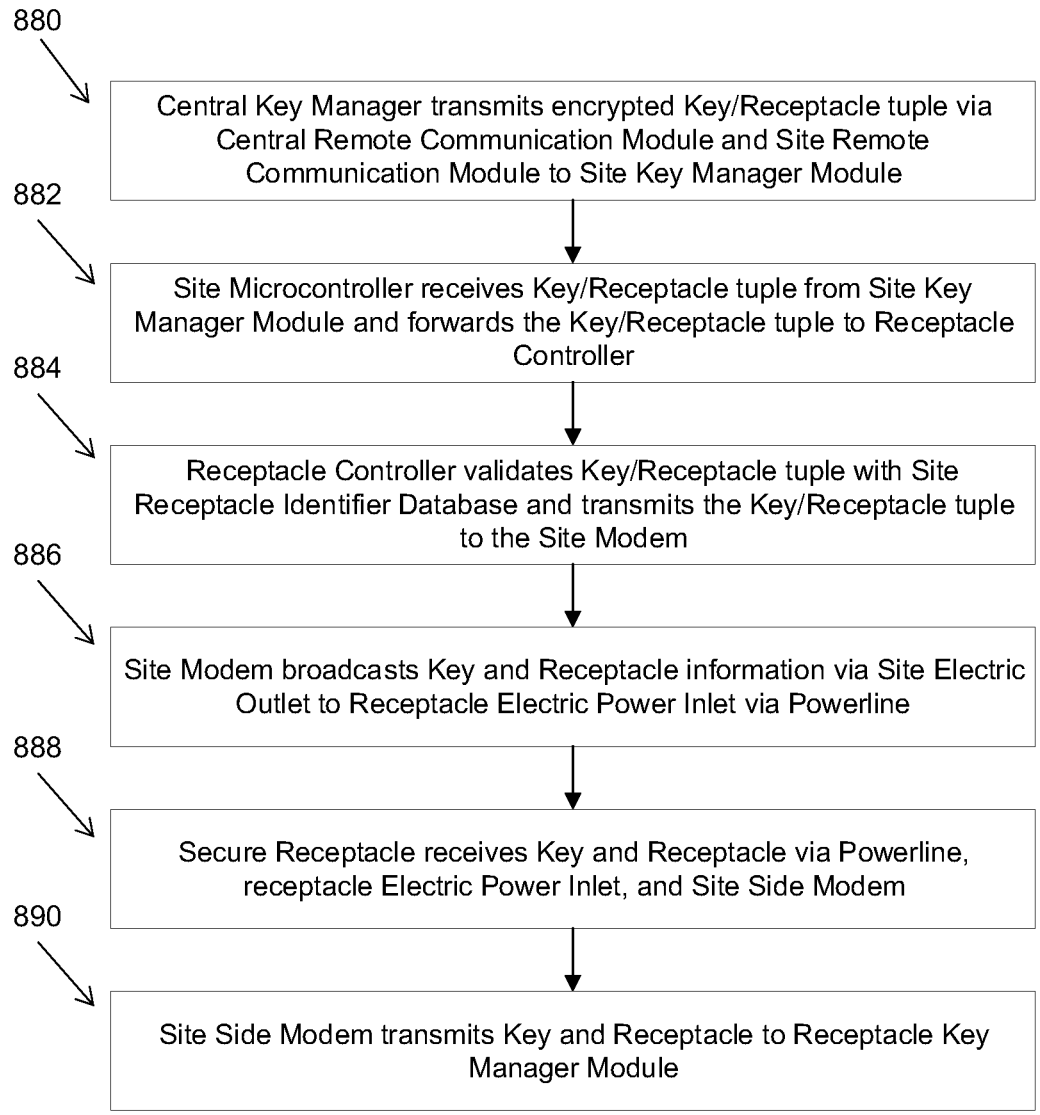
FIG. 8 shows the method for the propagation of the key from the central controller to the receptacle via the site power source.

FIG. 8 shows the method and process for propagating the key from the central controller to the secure receptacles via the site power source. In step 880, the central key manager transmits the key/receptacle tuple via the central remote communication module and site remote communication module to the site key manager module. In the preferred embodiment of the present invention the transmission of the key/receptacle tuple is encrypted. In step 882 the site microcontroller receives the key/receptacle tuple from the site key manager module and forwards the key/receptacle tuple to the receptacle controller. In step 884, the receptacle controller validates the key/receptacle tuple with the site receptacle identifier database, and upon validation the key/receptacle tuple is transmitted to the site modem. In step 886 the site modem broadcasts the key/receptacle tuple by introducing a signal in the powerline. The signal broadcasts from the site electric outlet to all the secure receptacles' receptacle electric power inlets. In step 888 the secure receptacles receive the key/receptacle tuple via the powerline and the receptacle electric power inlet, and subsequently process the signal in the site-side modem. In step 890 the site-side modem transmits the key/receptacle tuple to the receptacle key manager module for subsequent validation against the receptacle's identifier and the key to be provided by the user.

Figure 9:
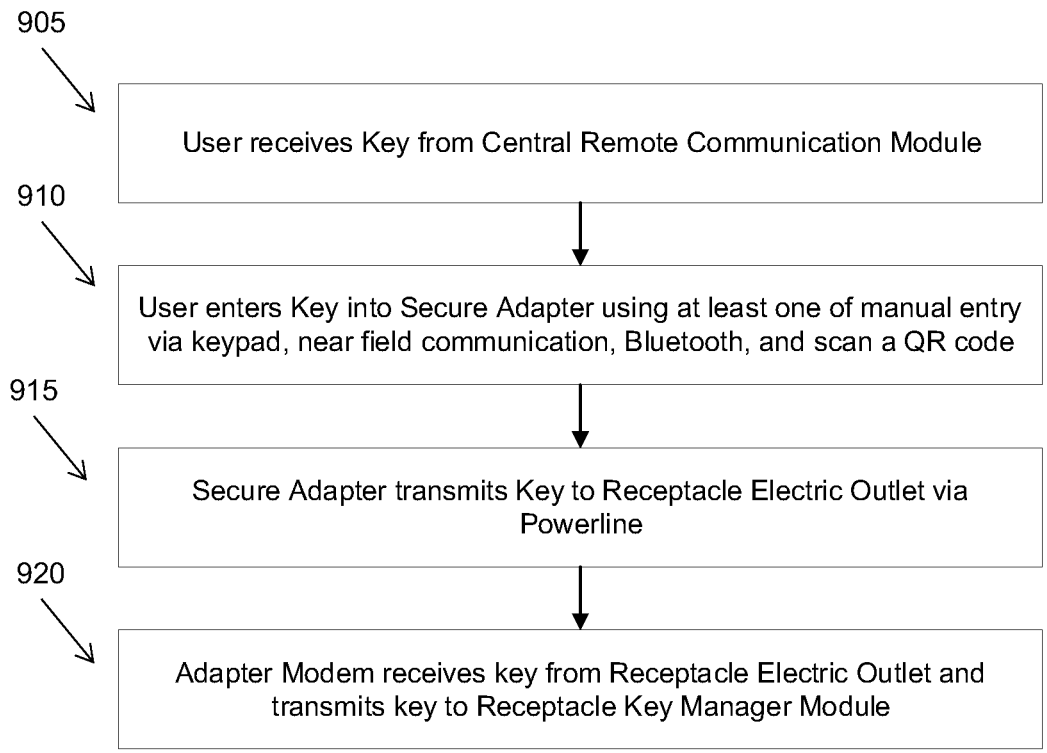
FIG. 9 shows the method for the propagation of the key to the receptacle via the user, the device, and the secure adapter.

FIG. 9 shows the method and process for propagating the key from the user, the device, and the secure adapter to the secure receptacle. In step 905 the user receives the key from the central remote communication module via conventional means such as e-mail, text message, phone call, QR code, or print. In step 910 the user enters the key into the secure adapter's key entry module using conventional means such manual key entry via a keypad, near field communication, Bluetooth, or scanning a QR code. In step 915 the secure adapter transmits the key to the receptacle electric outlet via the powerline within the receptacle. In step 920 the adapter modem receives the key from the receptacle electric power outlet and transmits the key to the receptacle key manager module.

Figure 10:
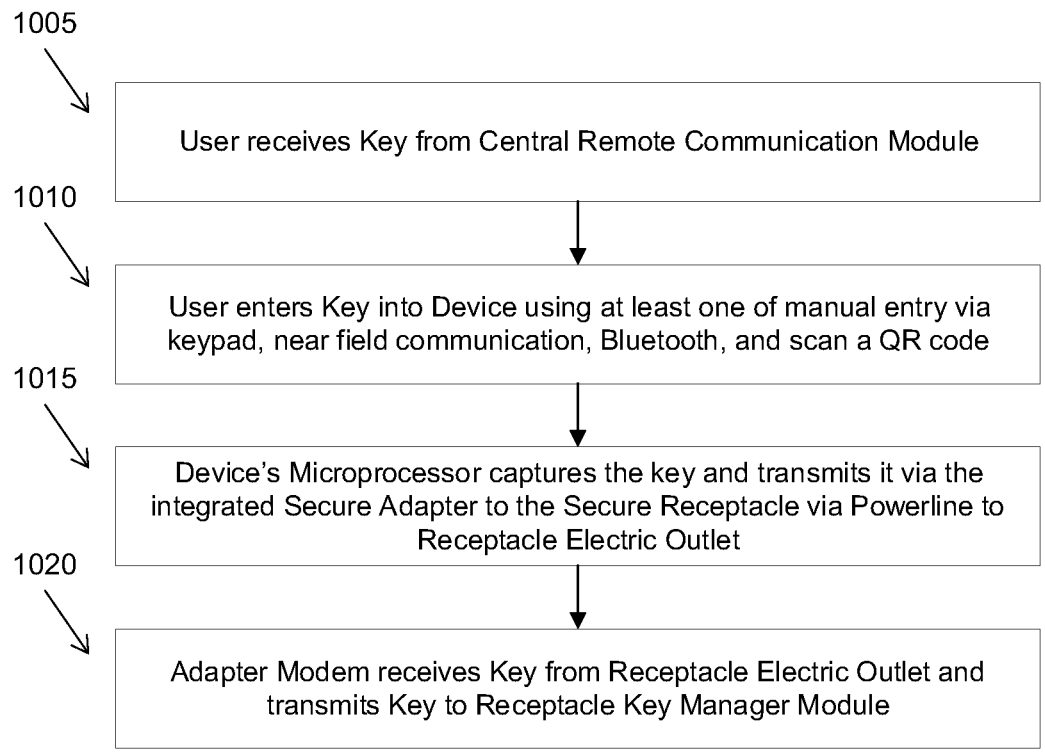
FIG. 10 shows the method for the propagation of the key to the receptacle via the user, and the device to the secure adapter where the secure adapter is integrated with the device.

FIG. 10 shows the method and process for propagating the key from the user and the device to the secure adapter where the secure adapter is integrated with the device. In step 1005 the user receives the key from the central remote communication module. In step 1010 the user enters the key into the device using conventional means such as manual entry via a keypad, near field communication, Bluetooth, or scanning a QR code. In step 1015 a microprocessor within the device captures the key and transmits the key via the integrated secure adapter to the secure receptacle's receptacle electric outlet via the powerline connection between the device and the secure receptacle. In step 1020 the adapter modem receives the key from the receptacle electric outlet and transmits the key to the receptacle key manager module.

Figure 11:
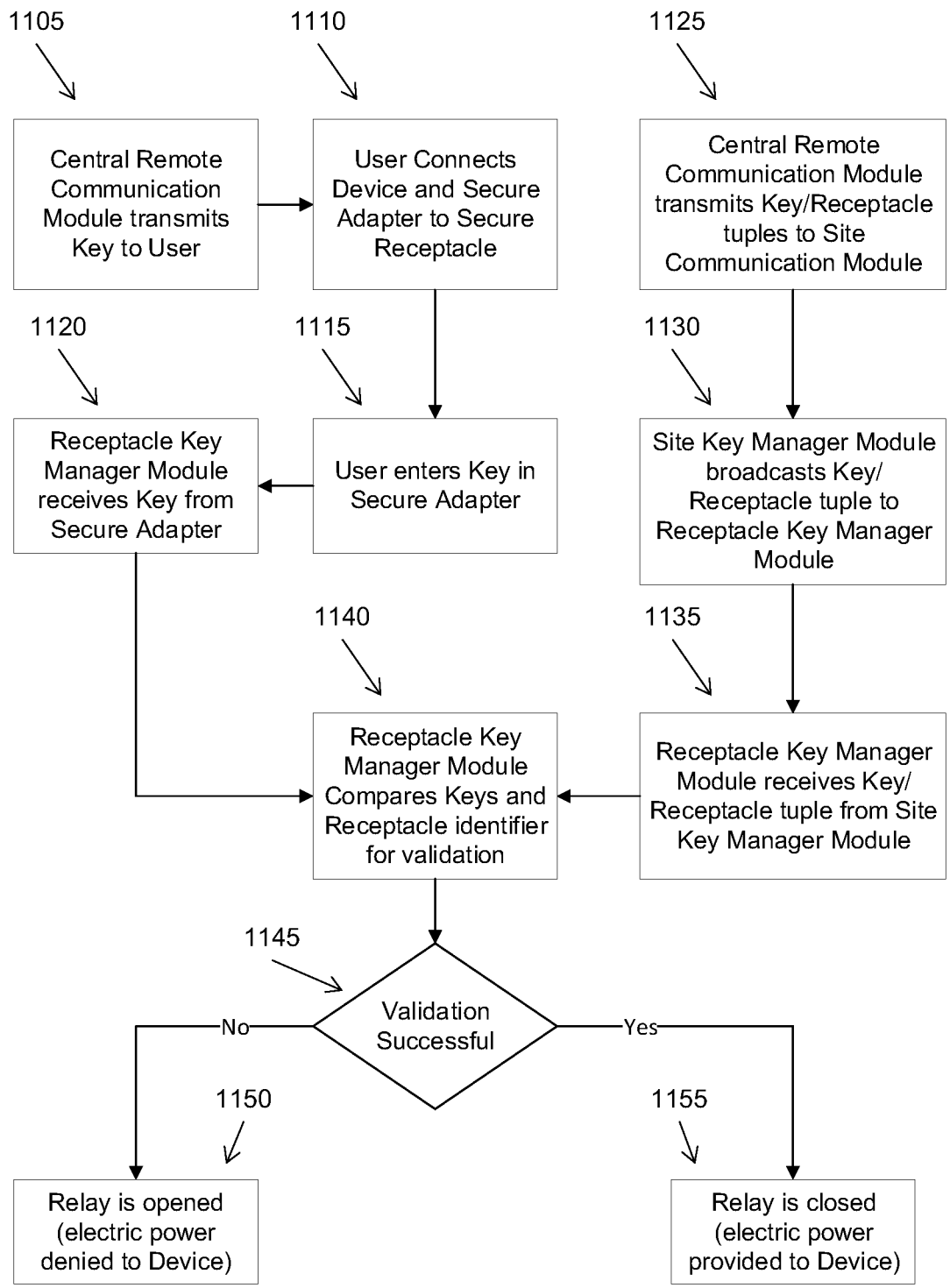
FIG. 11 shows the flowchart for using the key to validate the device.

As described earlier, the key is generated by the central controller and transmitted to the site controller and the user. After the device is plugged into the secure receptacle these two keys converge at the secure receptacle and are validated. If the key is validated then power is made available to the device; otherwise, the device is denied power by the secure receptacle. FIG. 11 shows the aforementioned method and process for using the key to validate the user and the device. In step 1105 the central remote communication module transmits the key to the user. In step 1110, the user connects the device and the secure adapter to the secure receptacle. This connection can be according to the embodiments described earlier, where the secure adapter is a separate device, or integrated with the device, or integrated with the secure receptacle. In step 1115 the user enters the key into the secure adapter. In step 1120 the receptacle key manager module receives the user-supplied key from the secure adapter via the powerline and modems, as described earlier. In parallel to above, in step 1125 the central remote communication module also transmits the key/receptacle tuple to the site communication module. In step 1130 the site key manager module broadcasts the key/receptacle tuple to the receptacle key manager modules in all the available secure receptacles. In step 1135 the receptacle key manager module receives the key/receptacle tuple from the site key manager module. In step 1140 the user-supplied key and the site-supplied key converge, and the receptacle key manager module compares the keys and the receptacle identifier and attempts to validate the keys in step 1145. If the aforementioned validation fails, then in step 1150 the relay is opened and the device is denied of electric power; otherwise, if the validation is successful, in step 1155 the relay is closed, and electric power is provided to the device. Optionally, the electric power may be made available to the device for a specific access duration as determined by the administrator when access is requested.

Figure 12:
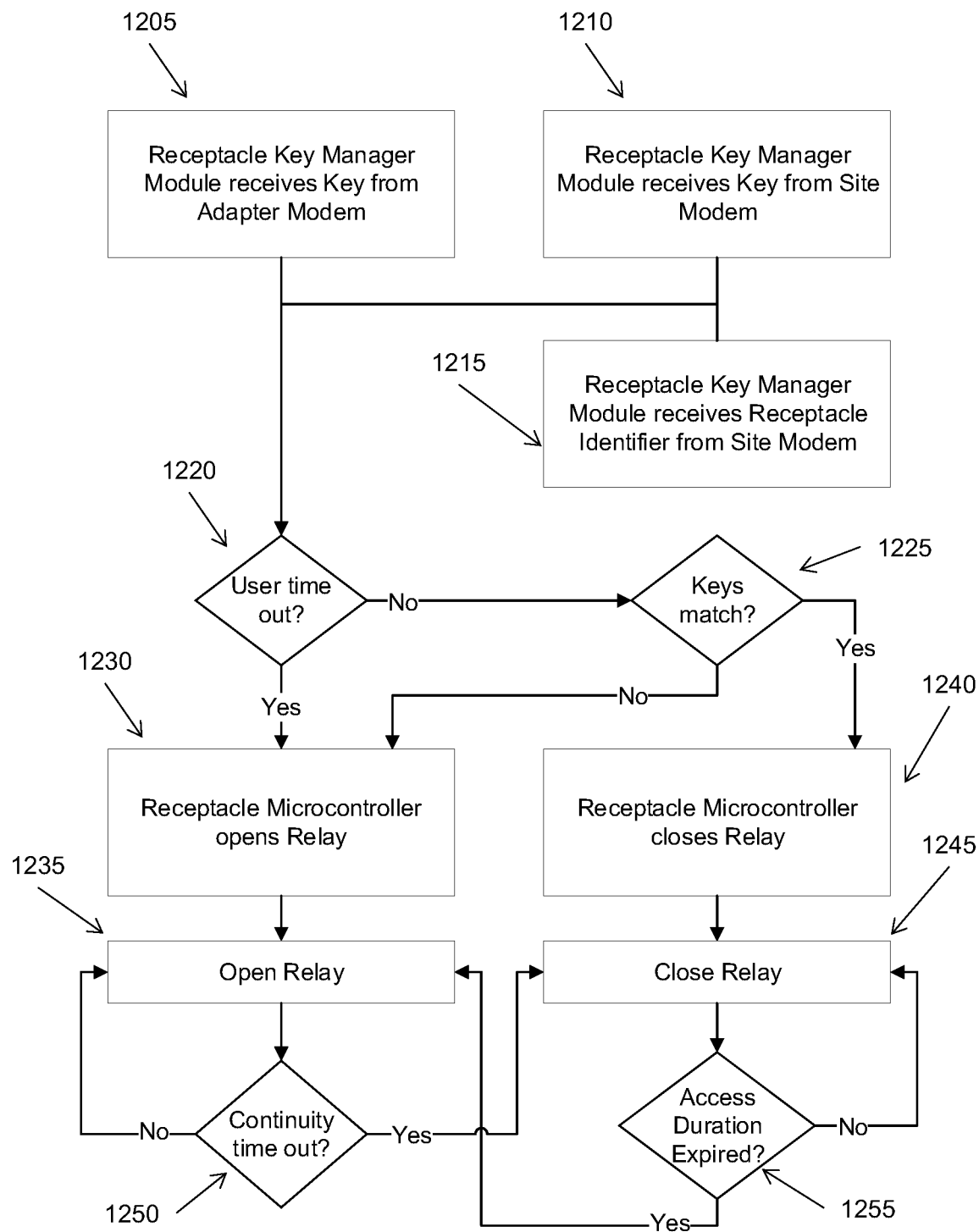
FIG. 12 shows the flowchart for the logic within the receptacle to open or close the relay.

FIG. 12 shows the method and process for the secure receptacle logic for opening and closing the relay upon the device being plugged into the secure receptacle. In step 1205 the receptacle key manager module receives the key from the adapter modem. In step 1210 the receptacle key manager module receives the key from the site modem. In step 1215 the receptacle key manager module receives the receptacle identifier from the site modem. In step 1220 the receptacle microcontroller together with the current detector evaluates the time between the device being plugged in the secure receptacle and the key being successfully entered. The duration taken in the step is compared against a pre-determined time-out duration. If the time-out period has expired then the device is denied power in step 1230, where the receptacle microcontroller opens the relay. The intended utility of this step is to provide electric power to the device so that the user has reasonable time to enter a key, but not any longer. If the user enters the key within the time-out period, then in step 1225 the keys are matched. If the key does not validate within the time-out period, then the device is denied power in step 1230; otherwise, if the key is validated then in step 1240 the receptacle controller closes the relay. In step 1230 the receptacle microcontroller opens the relay in response to a time-out or an invalid key, resulting in the relay to be open in step 1235. In step 1240 the receptacle microcontroller closes the relay in response to the timely entry of a valid key, resulting in the relay to be closed in step 1245. In step 1250, a continuity time-out is evaluated when the relay is open, and if the continuity time-out is valid the relay is closed, otherwise the relay remains open. The utility of this step is to deny electric power to an unauthorized user, disable the secure receptacle for the duration of the continuity time-out, and then provide access to other users after a period of time. In step 1255 the access duration is evaluated. If the access duration has expired, then the relay in opened; otherwise, the relay remains closed. The utility of this step is to allow an authorized user to continue receiving electric power until the access duration is exceeded. Optionally, a period of time prior to the expiration of the duration the user receives an alert about the upcoming termination to make adequate preparation; further, the administrator is given the option to extend the duration for the user.

Figure 13:
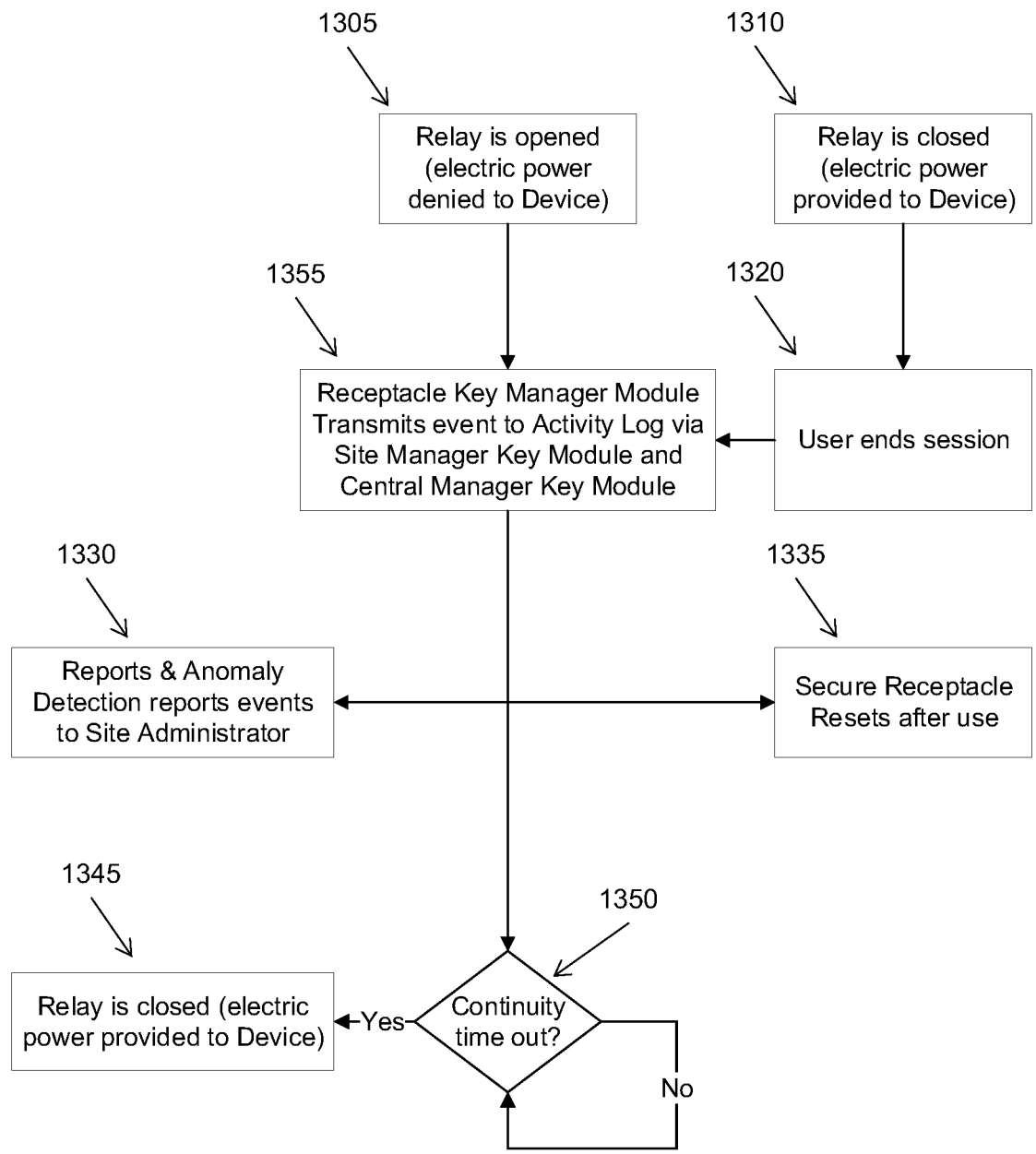
FIG. 13 shows the method for logging the device access activities and detecting anomalies.

FIG. 13 shows the method and process for logging the device access activities, anomaly detection, reporting, and resetting the relay for future use. In step 1305 the relay is opened due to time-out or invalid user access. In step 1310 the relay is closed, and electric power is provided to the user. In step 1320 the user ends the session either voluntarily or due to the duration time-out. In step 1355 after a change in relay status (as determined by the receptacle microcontroller) the receptacle key manager module transmits the relay status change to the activity log via site manager key module and central manager key module. This communication is enabled via the powerline, modems, and the remote communication modules as described earlier. In step 1330 the anomaly detection and reporting module records the relay and secure adapter usage and events, and optionally performs analysis on the logs. A person having ordinary skill in the art would recognize that many business intelligence, analytics, and artificial intelligence techniques are available for log analysis and anomaly detection. Anomaly detection involves any unusual or unexpected activity, particularly unauthorized attempts to access the secure receptacles. A report of the activities along with any anomaly detection findings are reported to the administrator for information and corrective action by the administrator. In step 1335 the secure receptacle resets after use. In step 1350 the continuity time-out is monitored, and if the continuity time-out has occurred, then in step 1345 the relay is closed and ready for use by the next user.

While the present invention has been described above in terms of specific embodiments, it is to be understood that the invention is not limited to these disclosed embodiments. Many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

What is claimed is:

1. A system for secure electric power delivery in order to validate a user of a device, the system comprising:
    at least one secure receptacle, wherein each secure receptacle comprises:
        a power inlet that connects to a power line on a site side of the secure receptacle, wherein the user connects the device to a user side of the secure receptacle and the user enters a user key into a secure adapter;
        a relay controlling a flow of electric power from the power inlet to the device connected to the secure receptacle;
        a receptacle key manager that receives a site-supplied key from a site key manager module and the user key from the secure adapter, the receptacle key manager module comparing the user key and the site-supplied key to attempt to validate the user; and a receptacle controller that operates the relay to open the relay and deny the device electric power when validation of the user fails; otherwise, the relay will close and electric power is authorized to be provided to the device when the validation of the user is successful; and an administrator hardware that transmits a request to permit the user to access power through one or more of the at least one secure receptacle, the request comprising; a user identifier identifying the user; and a receptacle key that the receptacle controller recognizes as authorization to provide identifier indicating which of the at least one secure receptacle the user is approved to access.

2. The system of claim 1, wherein each of the secure receptacles further comprises a power outlet connected to receive the flow of electrical power, the power outlet being configured for detachable connection to one of the secure adapter and the device on the user side of the secure receptacle.

3. The system of claim 2, wherein the power outlet of each of the secure receptacles is remotely located relative to one or more of the power inlet, the relay, the receptacle key manager, and the receptacle controller of the secure receptacle.

4. The system of claim 2, wherein the power outlet of each of the secure receptacles is integrated into a housing with one or more of the power inlet, the relay, and the receptacle controller of the secure receptacle.

5. The system of claim 1, further comprising at least one secure adapter, each secure adapter comprising a key entry module enabling the user to provide the user key to one of the at least one secure receptacle.

6. The system of claim 5, wherein each of the secure adapters is one of:
   a component of one of the at least one secure receptacle;
   a component of a user device capable receiving electric power through one of the at least one secure receptacle; and
   an interconnector including an adapter inlet and an adapter outlet, the adapter inlet being shaped to connect to and detach from the user side of the secure receptacles, the adapter outlet being shaped to connect to and detach from a user device.

7. The system of claim 1, wherein each of the secure receptacles further comprises:
   a site-side communication interface through which the receptacle key manager receives a set of valid site-supplied keys; and
   an adapter-side communication interface through which the receptacle controller receives the user key, wherein the receptacle controller implements the receptacle key manager module that compares the user key to the valid site-supplied keys received to recognize whether the user key is authorized.

8. The system of claim 1, wherein each secure receptacle further comprises a current detector connected to detect electric current to the user side, wherein the receptacle controller operates the relay to shut off the electric current and thereby disable the flow of electric power through the secure receptacle unless the secure receptacle receives and validates the user key within a limited time of the current detector detecting the electrical current.

9. The system of claim 1, further comprising a site power controller connected to the power inlets of the secure receptacles, the site power controller implementing:
   the site key manager module, the site key manager module maintaining a database containing valid keys and for each of the valid keys, identifying which of the secure receptacles are to recognize, as authorization, a user key matching the valid key; and
   a site communication module through which the site power controller updates the secure receptacles with information from the database.

10. The system of claim 9, wherein the site power controller further comprises a site remote communication module connected to communicate with a central controller that generates the valid keys.

11. The system of claim 9, wherein a power line connects the site power controller to one of the at least one secure receptacle, transmits electric power to the secure receptacle, and conducts communication signals to and from the secure receptacle.

12. The system of claim 1, further comprising wherein the administrator hardware is further configured to transmit in the request an access duration indicating a time during which the user is approved to access power.

13. The system of claim 1, further comprising a central controller configured to:
   generate the user key in response to the request from the administrator hardware; and
   distribute the user key to the user.

14. The system of claim 13, wherein the central controller maintains an activity log recording key validation activities or secure receptacle usage, the central controller comprising an anomaly detection module that analyzes the activity log and reports key and receptacle access activities to the administrator.

15. The system of claim 14, wherein when an active intrusion is detected, the anomaly detection module immediately sends an alert to the administrator.

* * * * *